Oct. 19, 1965 W. M. BERENBAK ETAL 3,212,376
CUTTING OF CELLULAR RESINOUS BODIES INTO SLABS
Filed April 30, 1963 5 Sheets-Sheet 2
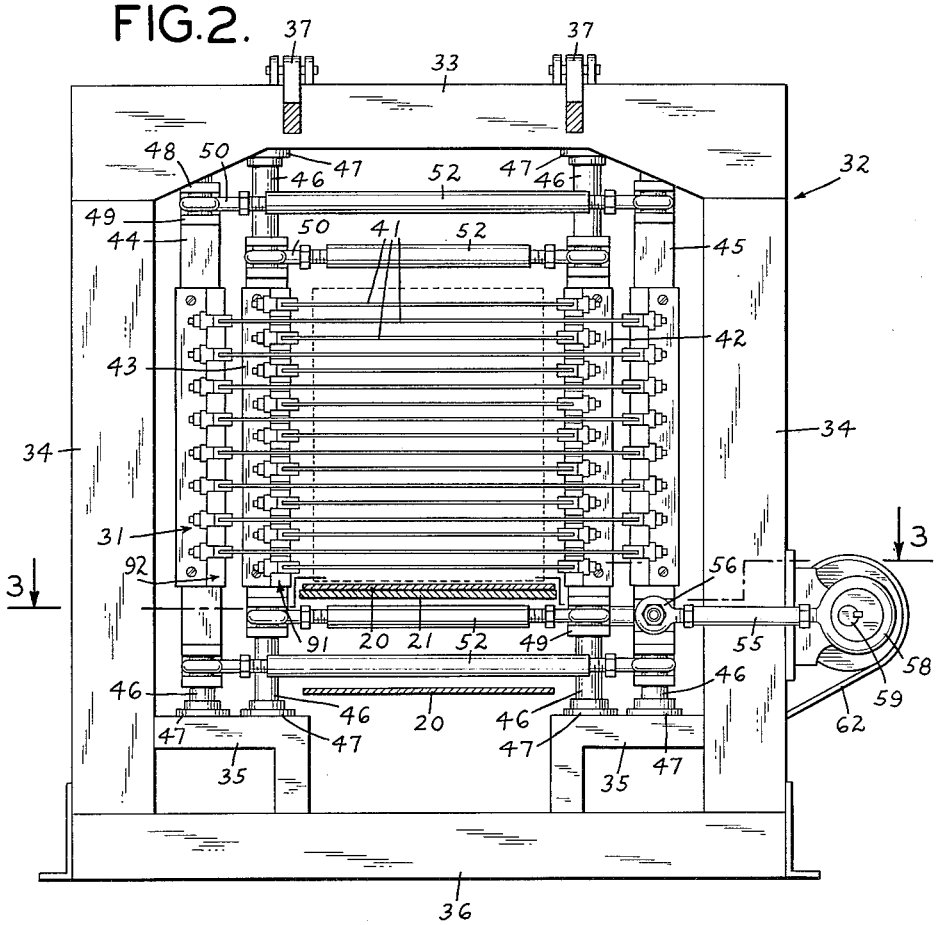
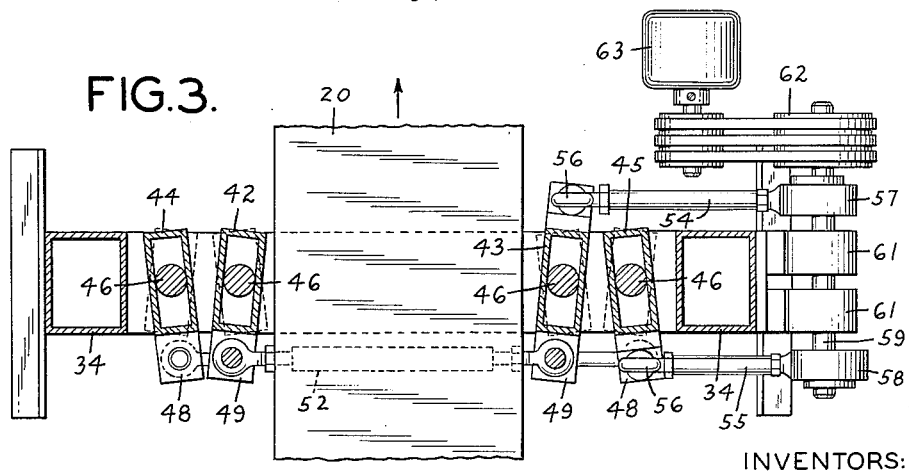
INVENTORS:
WILLIAM M. BERENBAK
LOUIS J. ERB
BY
ATTORNEY

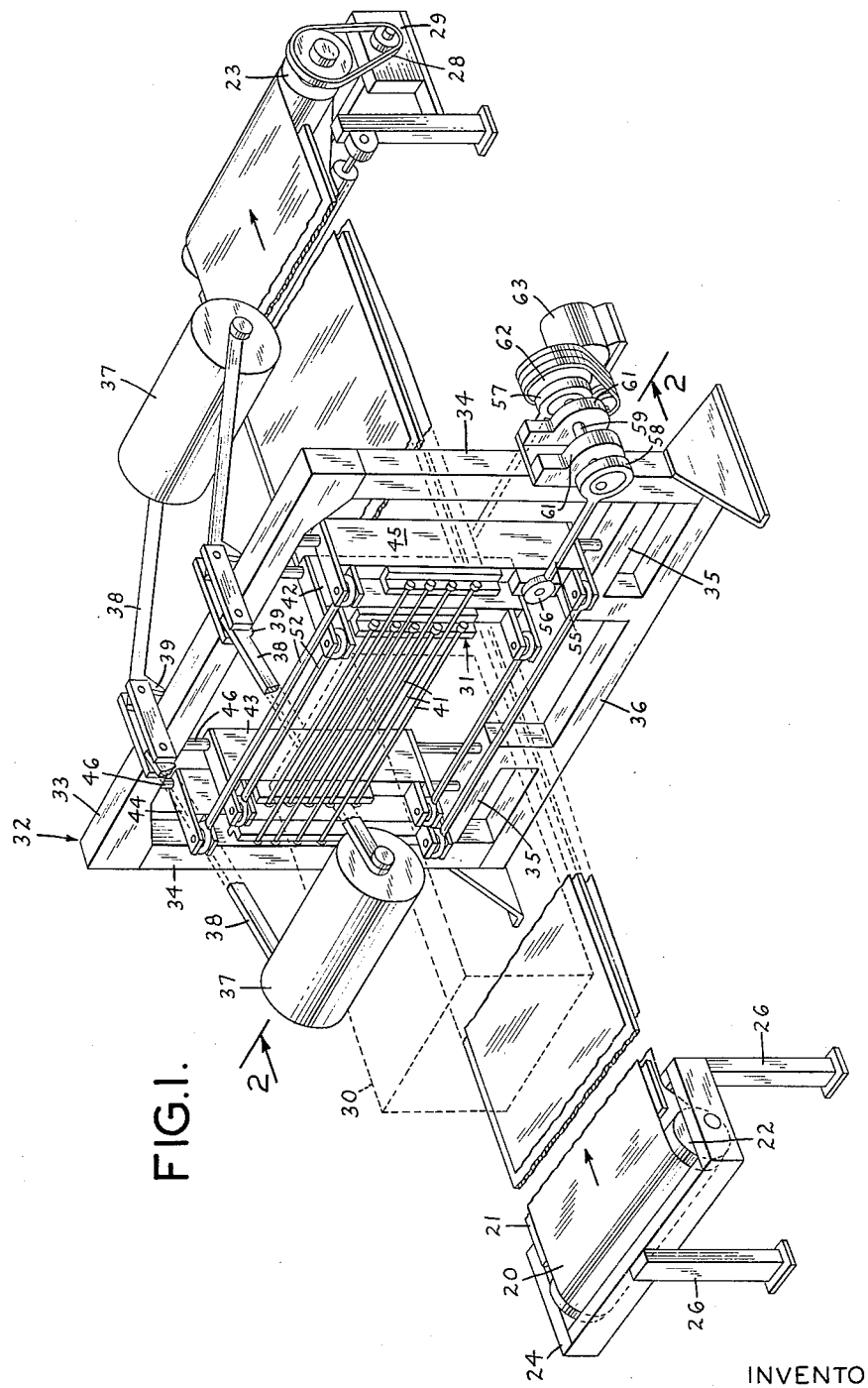

INVENTORS:
WILLIAM M. BERENBAK
LOUIS J. ERB
BY
ATTORNEY

INVENTORS:
WILLIAM M. BERENBAK
LOUIS J. ERB
BY
Richard E Vila
ATTORNEY

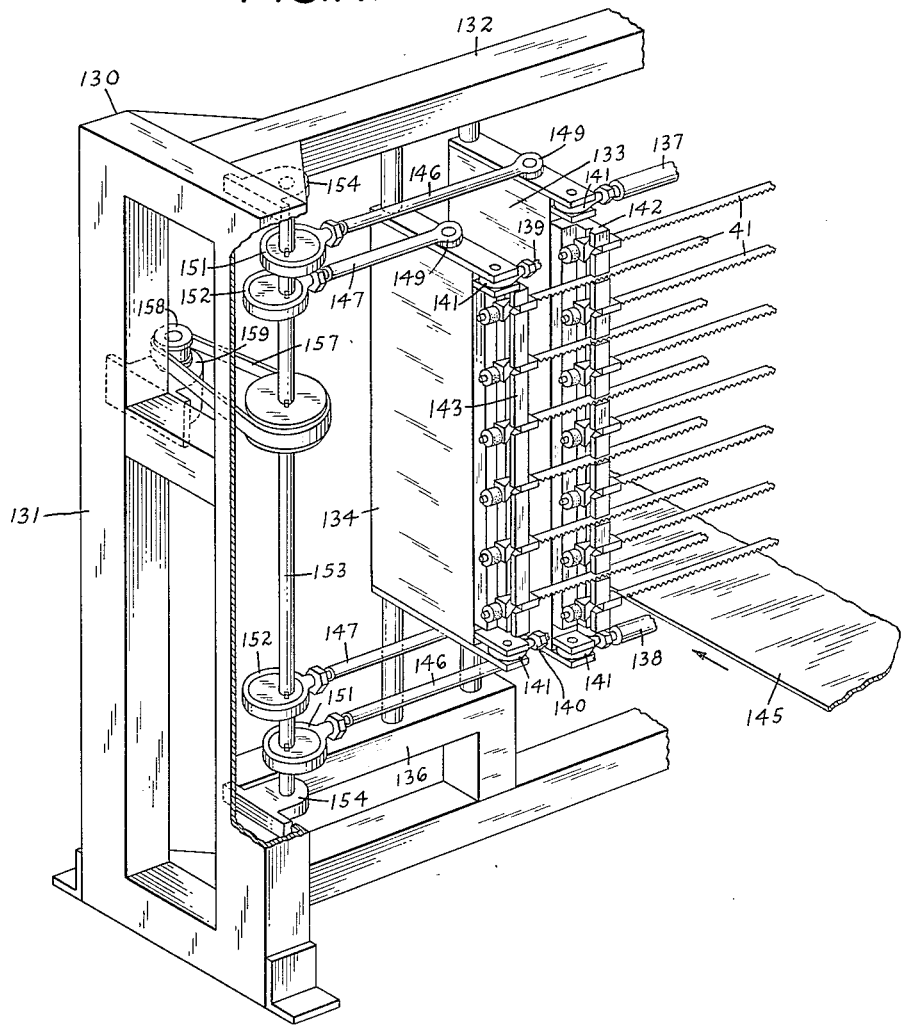

United States Patent Office 3,212,376
Patented Oct. 19, 1965

3,212,376
CUTTING OF CELLULAR RESINOUS BODIES INTO SLABS
William M. Berenbak, Mendham, and Louis J. Erb, Brookside, N.J., assignors to Allied Chemical Corporation, New York, N.Y., a corporation of New York
Filed Apr. 30, 1963, Ser. No. 276,817
25 Claims. (Cl. 83—4)

This invention relates to cutting of cellular bodies, and more particularly to improved apparatus for cutting a plurality of slabs from large blocks of expanded cellular resinous materials such as polyurethane foam.

Cellular products obtained by expansion of resinous materials are of increasing importance. Slabs or boards of a number of foamed materials such as polyurethane have been in constantly increasing demand for use in a variety of applications, including particularly insulating applications in a number of areas of the construction industry. In the production of such slabs or boards it is conventional to produce a large block or bun of the cellular material and then divide the block into a number of individual slabs. Because of certain properties inherent in the cellular resinous materials the production of slabs or boards has been far from a simple matter and heretofore highly inefficient. Characteristically, the prior art methods have been slow and costly. One such method involves the use of electrically heated wires which are drawn through the foamed material to cause severing of the cellular material. Not only is this approach undesirably slow in operation but also limited in application as certain foams are burned or charred by the hot wire. Another conventional approach to the production of slabs or boards of cellular material is the use of blade cutting equipment. Apparatus heretofore found suitable for cutting of resinous cellular materials in such operations are similar to the well-known band-saws and limited in capability to the making of only a single cut in the large cellular blocks. When a number of slabs are to be produced from the cellular block it has been therefore necessary to employ a plurality of band-saws connected in series or, more commonly, to make a number of single cuts with the same machine until the block is divided into the desired number of slabs. This latter procedure requires additional apparatus for returning the block to an original position in front of the machine and also adjustment of the machine for each successive cut. As slabs of typically 1 inch are cut from blocks 12-36 inches high the bandsaw type operations heretofore relied upon are obviously costly and inefficient.

An object of the present invention is to provide for improved cutting of cellular blocks of resinous material into a multiplicity of slabs or boards.

Another object of the invention is to provide apparatus for cutting large blocks of cellular material simultaneously in a single pass into a multiplicity of slabs.

Another object of the invention is to provide efficient and compact cutting apparatus for rapidly converting a cellular block into slab units in a single cutting operation.

A further object of the invention is to provide a foam cutting apparatus capable of readily cutting cellular blocks of substantial length at high speeds into a multiplicity of slabs of required thicknesses in a single pass of the block through the apparatus.

A further object is to provide a foam cutting apparatus having a multiplicity of spaced cutting blades and readily changeable with respect to blade setting to simultaneously produce slabs of most any desired thickness on a single pass of a block of cellular material through the machine.

A still further object of the invention is to provide a cutting machine of compact construction and low capital investment capable of operation at low cost and requiring little maintenance whereby blocks of cellular material may be rapidly and efficiently cut into a multiplicity of slabs during a single pass through the apparatus.

Still further objects include the provision of blade assemblies and interchangeable blade carriers permitting rapid change of blades and changeover of the apparatus to most any desired blade setting adapted to cut a multiplicity of slabs from blocks of cellular material.

Other objects and advantages will be evident from the following description of the invention and accompanying drawings, in which:

FIG. 1 is a perspective view of the cutting apparatus of the present invention.

FIG. 2 is a vertical section taken along 2—2 of FIG. 1 showing blade assembly and supporting members.

FIG. 3 is a horizontal section taken along line 3—3 of FIG. 2 and showing a preferred construction and arrangement of blade support members and mechanism for driving such members.

FIG. 11 is a fragmentary view in perspective with portions cut away showing a preferred arrangement of driving linkages for reciprocation of pivotally mounted blade support members.

Figure 4:
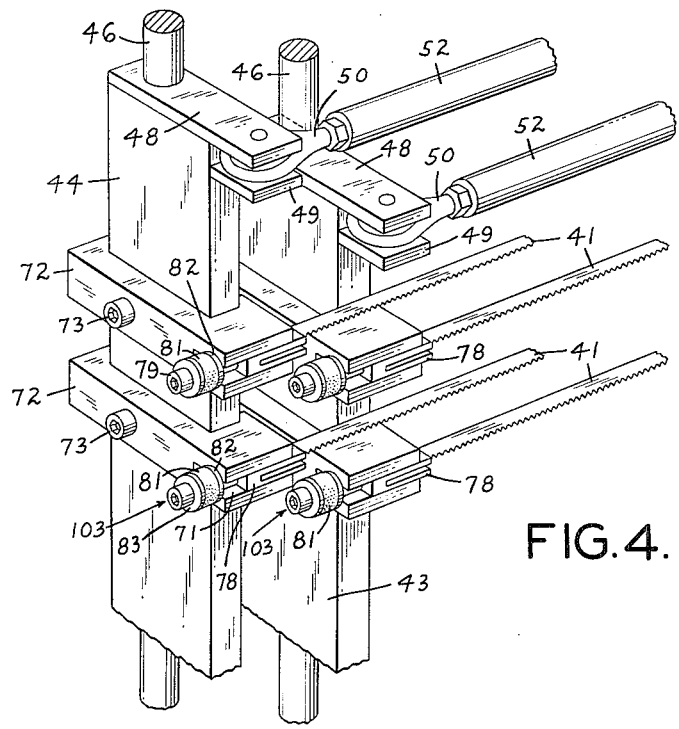
FIG. 4 is a fragmentary view in perspective showing detail of blade assembly pivotally mounted on blade support members.

Referring to the drawings, FIG. 1 shows the improved cutting apparatus of the invention to include a conveyor belt 20 which is supported during movement on a bedplate 21. Conveyor belt 20 has a slip-resistant surface desirably of corrugated rubber and is preferably an endless belt driven between rollers 22 and 23 which are supported on a conveyor frame assembly designated generally as 24 and including a plurality of upright legs 26 and a suitable bedplate support frame (not shown). The conveyor belt is driven through roll 23 by a gear train and drive chain assembly 28 attached to a variable speed gear box 29 which is driven by a suitable motor (not shown).

Conveyor belt 20 advances a large cellular body 30 into a reciprocating multiple blade cutting assembly designated generally as 31 and supported on the main stationary supporting frame 32 which includes an overhead frame member 33, vertical supporting frames 34 and lower extension frame members 35. The main stationary supporting frame 32 preferably includes a base frame 36 and is desirably rigidly secured to the floor or other supporting surface to avoid any undesirable vibration effects. Rollers 37 are supported on arms 38 and are pivotally mounted on overhead frame member 33 so that the rollers 37 exert a moderate pressure on the advancing cellular body to assure steady movement of the body along a generally fixed path during the cutting operation. Protrusions 39 on arms 38 maintain the rollers at a height sufficient to permit the rollers to automatically mount the advancing cellular body and also prevent the rollers from moving into the cutting assembly 31 when not in use.

The cellular body is moved steadily along on conveyor 20 into a plurality of saw-toothed blades 41 which reciprocate laterally in opposing short stroke movement to cut the cellular body into a number of slabs or boards as determined by the number of blades employed. Thickness of the boards produced is determined by the spacing between adjacent blades and may be any desired value, usually between ½ to 4 inches. Generally, the number of blades employed ranges between about 10 to 40 although most any number may be employed depending on the size of the machine and purpose of the operation. In cutting of rigid or semi-rigid cellular bodies of resinous material a saw-toothed blade is required for efficient operation with best results being obtained with high pitched blades in which the cutting edges of the teeth are set above a longitudinal line at the base of the teeth by an angle of 30° or more. As cutting is desirably effected in both lateral directions during reciprocation the teeth of the blades are desirably symmetrical or nearly symmetrical. Good results are obtained with blades having 15 to 40 teeth per inch with the individual teeth having at least one and preferably both cutting edges above the longitudinal base line of the blade by an angle between about 40° to 85°.

The blades are secured alternately under tension to a first pair of blade support members 42 and 43 and a second pair of blade support members 44 and 45. As shown, one pair of blade support members 42 and 43 preferably constitutes an inner pair with respect to the second pair of blade support members 44 and 45 although an alternating arrangement between the pairs of blade members may also be suitable. The blade support members include shaft members 46 which are desirably aligned along a common axis whose direction for purposes of definition is longitudinal with respect to the blade support member. Shafts 46 permit the blade support members to be pivotally mounted along such longitudinal axis on the main stationary supporting frame 32. As shown particularly in FIG. 2, the shaft members 46 are mounted on suitable bearings 47 between the overhead frame 33 and the lower extension frame members 35. The adjacent blade support members 42 and 45 and 43 and 44 are sufficiently spaced from each other to permit the blade support members to reciprocate in opposing directions without interference. The position of all blade support members is desirably such that the shafts 46 and blades secured to such members all lie in essentially the same plane normal to the path of movement of the cellular body being cut.

Figure 5:
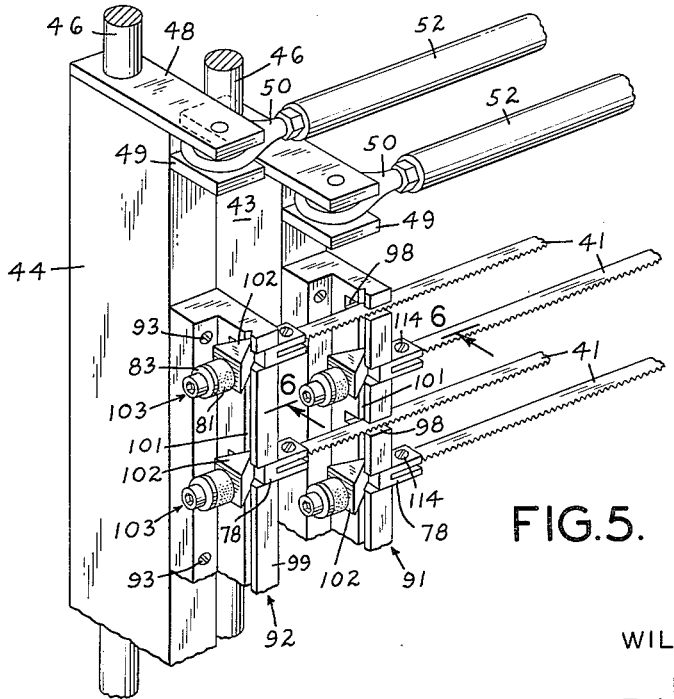
FIG. 5 is a fragmentary view in perspective showing in detail a preferred blade assembly including interchangeable blade carriers on pivotal blade support members.

As shown in FIGS. 2 and 3 and also in FIGS. 4 and 5, the blade support members also include extension bars 48 or other suitable means integral therewith permitting each pair of blade support members to be joined by suitable force-transmitting members. Each of the blade support members has preferably two sets of extension bars 48 and cooperating bearing support plates 49 between which rod bearing assemblies 50 are secured by pins 51 mounted between the bars 48 and plates 49. The rod bearings are secured between the extension bars 48 and bearing support plates 51 with the axis of such bearings being spaced a substantial distance from and generally parallel to the shafts 46 or longitudinal axis of the blade support members. The blade support members of each pair are joined through the rod bearings assemblies 50 by connecting rods 52 which transfer forces acting to reciprocate respective pairs during operation. Each pair of blades support members is preferably joined by two connecting rods 52 located on opposing sides of the path of movement of the cellular body or, as shown particularly in FIG. 2, on opposing sides of the conveyor belt 20 and its supporting bed-plate 21. Each of the two connecting arms joining each pair of blade support members is desirably positioned near the ends of the blade support members well outside the path of movement of the cellular body advancing on the conveyor belt 20. In the better forms of construction all the connecting rods 52 are aligned in the same plane which is generally parallel to the longitudinal axes of the blade support members and normal to the path of movement of the cellular body.

As shown on FIG. 1 and in detail on FIGS. 2 and 3, the pairs of blade support members 42 and 43 and 44 and 45 are equipped with means for reciprocating the pairs in opposing short stroke movement to cut a plurality of slabs or boards from the large body of cellular material as it comes in contact with the portion of the blades in the path of movement of the body. The opposing reciprocal action of the pairs of the blade support members is particularly desirable inasmuch as the opposing lateral forces induced by the cutting action of the blades are offset one against the other enabling the cellular body to move through the blades without undesirable lateral movement which might cause interference with the operation and uneven cutting of the cellular body. As shown particularly in FIGS. 2 and 3, each of the pairs of blades support members 42 and 43 and 44 and 45 are driven by arms 54 and 55, respectively, which are pivotally connected to the blade support members at one end by rod bearings 56 while the opposite ends of each arm is connected to eccentric hanger bearing assemblies 57 and 58, respectively. Eccentrics 57 and 58 are mounted on a shaft 59 which is supported on a pair of pillow blocks 61 attached to the side stationary frame member 34. Shaft 59 is secured to drive belts and pulleys assembly 62 which is driven by a suitable motor 63 rigidly secured to the floor or other support.

Figure 10:
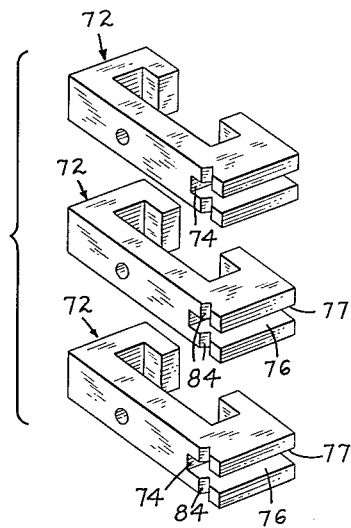
FIG. 10 is an exploded perspective view showing the individual blade carriers for use in the apparatus of the present invention.

The blade support members 42 through 45, inclusive, provide rigid bodies capable of pivotal action on the stationary supporting frame 32 and include the plurality of channels 71 associated therewith or other suitable openings having two opposing parallel surfaces adapted to receive blade assemblies employed in the apparatus of the invention, as illustrated in FIGS. 4 and 5. The opposing parallel surfaces of the channels should be spaced from and generally transverse the longitudinal axes or shafts 46 of the blade support members. Each of the channels 71 receives one end of a blade assembly. Hence, the channels as between each pair of blade support members are aligned in corresponding pairs as determined by having a plane between the opposing parallel surfaces of a channel in one blade support member aligned with a similar plane of a channel in the other blade support member of the pair of blade support members. The plane between the opposing parallel surfaces is preferably the central plane which is desirably also the blade plane. The common central planes of the corresponding channel pairs in the first pair of blade support members are spaced alternately with respect to the similar common central planes of the channel pairs in the second pair of support members so that the blade assemblies in the channel pairs have their blades spaced alternately with respect to the first and second pairs of blade support members. As the thicknesses of the slabs to be cut from the cellular body may be frequently subject to change the setting of the distance between the blades will also require change which should be made as expeditiously as possible to avoid undue downtime of the cutting operation. The blade support members are therefore desirably assemblies including a rigid pivotally mounted body having secured thereto adjustable or readily interchangeable channel blade carriers. As shown particularly in FIG. 4, each of the blade support members may be equipped with a plurality of individual blade carriers 72 which are preferably C-shaped and secured in position on the blade support members by a set screw 73. The individual blade carriers 72 are spaced along the blade support member and each have, as shown in FIG. 10, a channel 74 extending inwardly from an outer end thereof and entirely through the blade carrier. Channel 74 has two opposing parallel surfaces 76 and 77 which are machined smooth or planar to slidably fit a blade holder 78 inserted therein. The blade holder 78 forms part of a blade assembly secured to the blade carrier by means of a tensioning screw 79 which extends through the openeing at one end of the channel and has one end secured to the blade holder 78. A shock dampening member 81 is disposed on the tensioning screw 79 between a pair of bearing members 82 and 83. The openings in bearing members 82 and 83 through which the tensioning screw 79 passes are sufficiently large to permit the tensioning screw to move pivotally with relation to the blade carrier on reciprocation of the blade support member on its shaft 46. As shown particularly in FIG. 10, the blade holders 72 preferably have opposing shallow recesses 84 in the surfaces of the blade carrier at one end of the channel 74. Recesses 84 are adapted to receive a pivotal bearing member or washer bridging the opening at the end of the channel between the opposing parallel surfaces thereof. Spacing between adjacent blades held by the individual blade carriers 72 may be changed by loosening the set-screws 73 and repositioning the blade carriers as desired along the blade support members.

Figure 9:
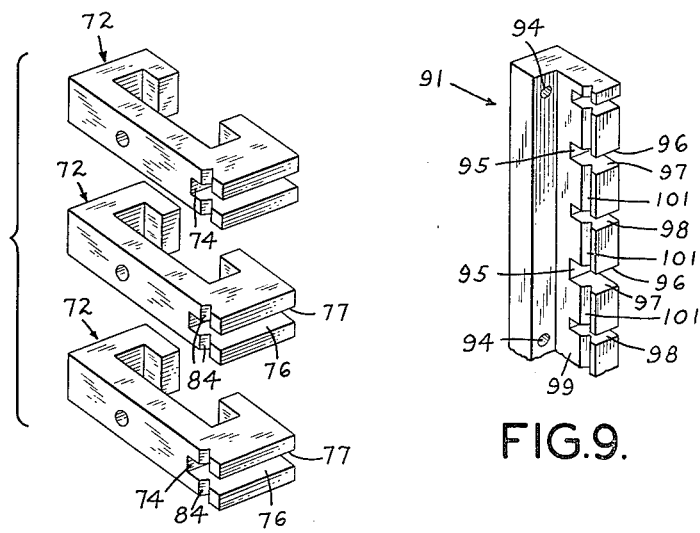
FIG. 9 is a perspective view showing in detail a preferred blade carrier used in the present invention.

A particularly preferred blade support and carrier arrangement is shown in FIG. 5 to include pivotally mounted blade supporting members 43 and 44 having secured thereto unitary multiple-blade carriers 91 and 92, respectively. Similar corresponding blade carriers are secured on the opposing blade support members of each pair (not shown). Each of the blade carriers 91 and 92 are detachably mounted on the blade support members by suitable means such as threaded bolts 93 which are fitted through openings 94 (FIG. 9) in the carriers and secured to the main body of the blade support member. The blade carriers 91 and 92, as also shown in detail in FIG. 9, are preferably L-shaped and have a plurality of parallel channels 95 spaced according to the thickness of the slabs to be cut and of number determined by the number of blades to be held by the carrier. The channels 95 have opposing parallel smooth or planar surfaces 96 and 97 carefully machined to slidably fit the blade holder 81. The blade carriers such as blade carrier 92 which are to be secured to the inner pair of blade support members 42 and 43 (FIG. 2) also have relatively narrow channels 98 permitting the passage therethrough of the blades supported on the outer pair of blade carriers. Channels 98 are spaced alternately between the channels 95 and permit all blades in the apparatus to be maintained essentially in parallel relation. The channels 95 extend entirely through the leg 99 of the L-shaped blade carrier and permit blade assemblies including blade holders 78 to be pivotally secured to the blade carrier in a manner similar to that in which these assemblies are secured to the individual blades 72 shown in FIG. 4. As shown in FIGS. 5 and 9, the blade carriers 91 and 92 have shallow recesses 101 in the surface of the carrier at the end of the channels opposing the end from which the blades extend. Each such channel end has opposing recesses associated therewith on each side of the channel end opening at which the opposing parallel surfaces of the channel terminate. The opposing shallow recesses 101 may be any suitable shape to receive a pivotal acting member. Thus, the recesses may be concave or, as shown in the drawings, in the form of shallow V-shaped channels fitting the wedge-shaped pivot member 102. The unitary, multiple blade carriers shown in FIGS. 5 and 9 have predetermined blade settings according to the spacing between the channels and provide a particularly efficient and accurate method of setting and changing the spacing between blades. Such operations are readily accomplished simply by substituting a blade carrier having the desired channel spacing and then mounting the blade assemblies thereon.

Figure 6:
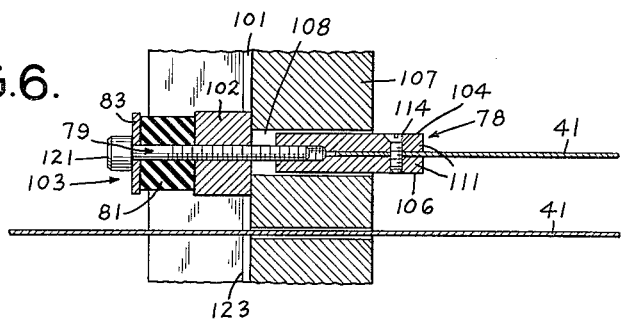
FIG. 6 is a sectional view taken along line 6—6 of FIG. 5 showing in detail a preferred construction of a blade assembly on a blade carrier.
Figure 7:
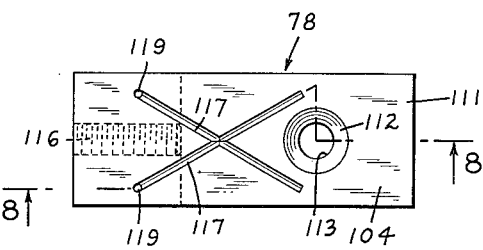
FIG. 7 is a plan view showing in detail a preferred blade holder for use in the apparatus of the present invention.
Figure 8:
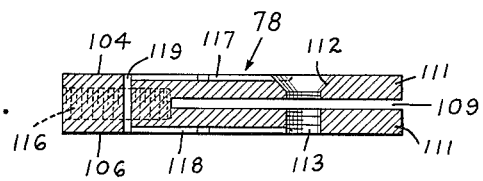
FIG. 8 is a staggered section taken along 8—8 of FIG. 7 showing construction details of the blade holder.

The blade assemblies and their mounting on the blade carriers include several features important to the operation of the cutting apparatus of the invention. As shown in FIGS. 4, 5 and particularly FIG. 6 the blade assemblies designated generally as 103 desirably include a blade 41 and at each end thereof a blade holder 78, a blade tensioning screw 79, a pivotal washer 102, shock dampening washer 81 and outer bearing member 83. The apparatus of the present invention operates at high speeds in order to rapidly and efficiently cut the slabs from the cellular material. In such high speed operation the heat of friction generated by contact of the blades with the cellular material tends to build up in the blades to an undesirable level. In order to effectively dissipate this heat which is transmitted through the blades and provide for proper constant alignment of the blades during such high speed operation the blade holders are slidably fitted into the channels in the blade carriers. The blade holder 81 for these purposes is shown in detail in FIGS. 7 and 8 and has parallel opposing surfaces 104 and 106 of relatively large surface area and machined smooth to slidably fit within a channel 107 of a blade carrier 108. The blade holder is rigidly or fixedly secured to the blade and is preferably relatively thin with a deep narrow channel 109 extending inwardly from one of the side ends and adapted to receive snugly the end of the blade 41. The blade holder is preferably constructed of tool steel and of such thickness that channel 109 forms a pair of prongs 111 integral with the blade holder and sufficiently compressible so that the blade may be fixedly secured in the channel 109. The blade holder has a countersunk opening 112 extending from surface 104 over the channel 109 and aligned with a threaded opening 113 in the other prong to receive a screw 114 adapted to apply sufficient pressure on tightening thereof to fixedly secure the blade in the channel. At the end of the blade holder 81 opposite the channel there is a threaded hole 116 for attachment of the blade tensioning screw 79. The relatively large area of contact between the surfaces 104 and 106 of the blade holder 78 and the corresponding surfaces of the channels in the blade carriers requires lubrication which may be effectively provided by equipping the blade holders with shallow recesses or channels 117 and 118 in the surfaces 104 and 106, respectively. The channels 117 and 118 on the respective surfaces are connected by openings 119 through the blade holder to allow lubricating fluid applied on one of machined surfaces to be also distributed on the opposing surface. Openings 119 are typically about 1/16 inch in diameter. Suitable lubricant for use in the operation is medium weight machine oil. The blade holders slidably fitted in the channels of the blade carrier 107 are held in position by the tensioning forces acting between the blade 41 and blade tensioning screw 79 which is secured to the end of the blade holder opposite the prongs. Between the blade and the capped or bearing end 121 of the screw 79 are a pivot washer 102, a shock dampening washer 81, and outer bearing member 103, each held on the tensioning screw 79. The pivot washer 102 which is preferably wedge-shaped is desirably spaced from the end of the blade holder. V-shaped recesses 101 in the surface 123 at the end of channel 108 secure the wedge end of the pivotal washer 102 in bridging relation across the opening at the end of the channel. If desired, a wear piece (not shown) of suitable metal such as brass or babbit may first be used to bridge the end of the channel and the pivotal washer 102 then secured in recesses provided in the wear piece. Adjacent the pivotal washer 102 is a shock dampening washer 81 which is an important contributing factor to the efficient cutting of large bodies of cellular material in the apparatus. The shock dampening washer may be composed of any suitable resilient, shock-absorbing material such as natural rubber or synthetic rubber. Good results are obtained with natural rubbers having Shore A hardness values of about 40–45. The outer bearing member 83 is of suitable wear-resistance metal and serves to protect the shock dampening member 81 against forces exerted on the blade assemblies during operation. The blade assemblies which may be preassembled are readily secured to the blade support members by placing the blade holders in the channels of the blade carriers and tightening the blade tensioning screws 79 while the pivot and shock dampening washers are properly positioned until the blades are under the desired tension and blade assemblies firmly secured to the blade carriers.

A particularly preferred arrangement of driving means for reciprocating the blade support members in opposing short stroke movement is shown in FIG. 11. A main stationary supporting frame 130 includes a side frame 131 and overhead frame 132. Blade support members 133 and 134 representing one from each pair of such members opposing each other across the path of movement of the cellular body are pivotally mounted along a longitudinal axis between the overhead frame 132 and auxiliary supporting frame extension member 136. Each of the blade support members 133 and 134 are connected to the corresponding member of their respective pairs by force-transmitting connecting rods 137, 138, 139 and 140. Each of the connecting rods are pivotally secured to the blade support members by bearings 141 having a central axis parallel to the longitudinal axis of the blade support members and well spaced from such longitudinal axis to permit the connecting rods to transmit the forces for simultaneous reciprocation of each member of the blade support pairs and to permit the connecting rods to move pivotally with respect to such blade support members. Each of the connecting rods is joined near the longitudinal ends of the blade support members at opposite sides of the blade carriers 142 and 143 which are detachably secured to the blade support members 133 and 134, respectively. The connecting rods on each of the blade support members are also on opposing sides of the conveyor belt 145 and path of movement of the cellular block therealong. The blade support member 134 which is more outwardly with respect to the path of movement is smaller in dimension in its longitudinal direction than the more inwardly positioned blade support member 133. The difference in length between the blade support members 133 and 134 is sufficient to permit their respective drive rods 146 and 147 to be spaced in parallel relationship and in the same plane which is essentially parallel to the longitudinal axes of the blade support members. The drive rods 146 and 147 are pivotally mounted on the rod bearings 149 located approximately mid-way between the longitudinal axis of the blade support members and the connecting rods 137 through 140, inclusive. The drive rods 146 and 147 are joined at their opposite ends to eccentric rod bearings 151 and 152, respectively. The eccentric rod bearings are fixed on a rotating shaft 153 which is supported by pillow blocks 154 which are secured to the frame 131. A pulley 146 keyed centrally on the shaft 153 is connected through drive belts 157 to a pulley 158 which is attached to a suitable motor 159 which is also secured to frame 131. The eccentric rod bearings 151 and 152 are essentially the same and set to reciprocate the blade support members 133 and 134 in opposing short stroke movement on rotation of shaft 153.

The cutting apparatus of the present invention provides an efficient and rapid method of dividing large bodies of cellular resinous material into a plurality of slabs or boards. Operating speeds are typically of a high order within the range of about 200 to 2000 strokes per minute equivalent to about 100 to 1000 blade reciprocations per minute. The length of a single stroke may be typically about ¼ inch to 4 inches, more usually about ⅜ to 1 inch, depending on the desired cutting rate and type of product to be produced. The cutting apparatus is particularly adapted for the cutting of rigid or semirigid type cellular resinous materials. Flexible or soft bodies of resinous cellular materials may be sliced using the apparatus by employing scalloped or serrated edge blades. Typical examples of such cellular resinous materials include foams of polyurethane, polystyrene, polyvinyl chloride, polyethylene and synthetic and natural rubbers. A number of such cellular materials prepared particularly by open mold expansion have characteristic cell structures which produce slabs of widely varying cell structure and properties depending upon the direction of cutting into the cellular block. Slabs of such widely varying characteristics may be produced on the apparatus of the present invention by positioning the cellular block on the conveyor belt in the desired position in relation to the direction of expansion of the block as required to produce the slabs of the desired properties. In situations where the cellular blocks have substantial width compared to thickness and positioning on the relatively narrow ends may be inconvenient, the apparatus of the present invention as described and shown on the drawings may be readily constructed in a position equivalent to a rotation of 90° of the cutting assembly with the blades set in parallel vertical spaced relationship to path of movement on the conveyor belt to permit the desired cutting of the cellular body.

Although certain preferred embodiments of the invention have been disclosed for purpose of illustration, it will be evident that various changes and modifications may be made therein without departing from the scope and spirit of the invention.

We claim:

1. Apparatus for cutting a body of expanded cellular resinous material comprising, in combination, means for advancing the cellular body steadily along a generally fixed path, stationary supporting means in spaced relation to the path of movement of said body, a first pair of blade support members each adapted to secure a plurality of blades and including axial members pivotally mounting said blade support members on the stationary supporting means at opposing sides of said path of movement, a second pair of blade support members each adapted to secure a plurality of blades and including axial members pivotally mounting said second pair of blade support members on the stationary supporting means at the same opposing sides of the path of movement as said first pair of blade support members and in spaced relation thereto, a plurality of thin spaced blades in the path of said cellular body, means pivotally securing said blades alternately on the first and second pairs of blade support members, and means for simultaneously reciprocating said pairs of blade support members in opposing short stroke movement to cut a plurality of slabs from the cellular body as the body moves into said blades.

2. Apparatus for cutting a body of expanded cellular resinous material comprising, in combination, means for advancing the cellular body steadily along a generally fixed path, stationary supporting means in spaced relation to the path of movement of said body, a first pair of blade support members each adapted to secure a plurality of blades and including axial members pivotally mounting said blade support members on the stationary supporting means at opposing sides of said path of movement, a second pair of blade support members each adapted to secure a plurality of blades and including axial members pivotally mounting said second pair of blade support members on the stationary supporting means at the same opposing sides of the path of movement as said first pair of blade support members and in spaced relation thereto, a plurality of thin-toothed spaced blades in the path of said cellular body, means pivotally securing said blades alternately on the first and second pairs of blade support members, shock-dampening means associated with the last-named means, and means for simultaneously reciprocating said pairs of blade support members in opposing short stroke movement to cut a plurality of slabs from the cellular body as the body moves into said blades.

3. Apparatus for cutting a body of expanded cellular resinous material comprising, in combination, means for advancing the cellular body steadily along a generally fixed path, stationary supporting means in spaced relation to the path of movement of said body, a first pair of blade support members each adapted to secure a plurality of blades and including axial members pivotally mounting said blade support members on the stationary supporting means at opposing sides of said path of movement, a second pair of blade support members each adapted to secure a plurality of blades and including axial members pivotally mounting said second pair of blade support members on the stationary supporting means at the same opposing sides of the path of movement as said first pair of blade support members and in spaced relation thereto, a plurality of thin-toothed spaced blades in the path of said cellular body, blade holders fixedly secured to each end of said blades, means for slidably and pivotally securing said blade holders and blades alternately on the first and second pairs of blade support members, and means for simultaneously reciprocating said pair of blade support members in opposing short stroke movement to cut a plurality of slabs from the cellular body as the body moves into said blades.

4. Apparatus for cutting a body of expanded cellular resinous material comprising, in combination, means for advancing the cellular body steadily along a generally fixed path, stationary supporting means in spaced relation to the path of movement of said body, a first pair of blade support members pivotally mounted on the stationary supporting means at opposing sides of said path of movement, a second pair of blade support members pivotally mounted on the stationary supporting means at the same opposing sides of the path of movement as said first pair of blade support members and in spaced relation thereto, a plurality of thin saw-toothed spaced blades in the path of said cellular body, blade holders fixedly secured to each end of said blades, means for slidably and pivotally securing said blade holders and blades alternately on the first and second pairs of blade support members, shock-dampening means of resilient rubber associated with said last-named means, and means for simultaneously reciprocating said pairs of blade support members in opposing short stroke movement to cut a plurality of slabs from the cellular body as the body moves into said blades.

5. The apparatus of claim 4 in which the shock-dampening means is composed of resilient natural rubber having Shore A hardness between about 40–45.

6. Apparatus for cutting a body of expanded cellular resinous material comprising, in combination, means for advancing the cellular body steadily along a generally fixed path, stationary supporting means in spaced relation to the path of movement of said body, a first pair of blade support members each pivotally mounted along a longitudinal axis on the stationary supporting means at opposing sides of said path of movement, a second pair of blade support members each pivotally mounted along a longitudinal axis on the stationary supporting means at the same opposing sides of the path of movement as said first pair of blade support members and in spaced relation thereto, each of said pairs of blade support members including a plurality of channel pairs correspondingly aligned along a common plane between opposing parallel planar channel surfaces which are spaced from and transverse with respect to the longitudinal axis of the blade support members, blade holders having two opposing parallel planar outer surfaces slidably fitted between the opposing parallel planar surfaces of the channels, a plurality of thin saw-toothed spaced blades in the path of movement of the cellular body each fixedly secured at their ends to the blade holders in the corresponding channel pairs alternately in the first and second pairs of blade support members, means pivotally securing said blade holders to said first and second pairs of blade support members, and means for simultaneously reciprocating said pairs of blade support members in opposing short stroke movement to cut a plurality of slabs from the cellular body as the body moves into said blades.

7. Apparatus for cutting a body of expanded cellular resinous material comprising, in combination, means for advancing the cellular body steadily along a generally fixed path, stationary supporting means in spaced relation to the path of movement of said body, a first pair of blade support members each pivotally mounted along a longitudinal axis on the stationary supporting means at opposing sides of said path of movement, a second pair of blade support members each pivotally mounted along a longitudinal axis on the stationary supporting means at the same opposing sides of the path of movement as said first pair of blade support members and in spaced relation thereto, each of said pairs of blade support members including a plurality of channel pairs correspondingly aligned along a common plane between opposing parallel planar channel surfaces which are spaced from and transverse with respect to the longitudinal axis of the blade support members, blade holders having two opposing parallel planar outer surfaces slidably fitted between the opposing parallel planar surfaces of the channels, a plurality of thin saw-toothed spaced blades in the path of movement of the cellular body each fixedly secured at their ends to the blade holders in the corresponding channel pairs alternately in the first and second pairs of blade support members, means pivotally securing said blade holders to said first and second pairs of blade support members, shock-dampening means associated with said last-named means, and means for simultaneously reciprocating said pairs of blade support members in opposing short stroke movement to cut a plurality of slabs from the cellular body as the body moves into said blades.

8. Apparatus for cutting a body of expanded cellular resinous material comprising, in combination, means for advancing the cellular body steadily along a generally fixed path, stationary supporting means in spaced relation to the path of movement of said body, a first pair of blade support members each pivotally mounted along a longitudinal axis on the stationary supporting means at opposing sides of said path of movement, a second pair of blade support members each pivotally mounted along a longitudinal axis on the stationary supporting means at the same opposing sides of the path of movement as said first pair of blade support members and in spaced relation thereto, a plurality of individual blade carriers adjustably secured to each member of said pairs of blade support members, said blade carriers having therein a channel having two opposing parallel planar surfaces generally transverse with respect to the longitudinal axis of the blade support members, the channels in blade carriers on one blade support member forming corresponding channel pairs with channels in blade carriers on the other member in each of the pairs of blade support members by reason of alignment along a common plane between the opposing parallel planar channel surfaces, blade holders having two opposing parallel planar outer surfaces slidably fitted between the opposing parallel planar surfaces of the channels, a plurality of thin saw-toothed spaced blades in the path of movement of the cellular body fixedly secured at their ends to the blade holders in the corresponding channel pairs in the blade carriers alternately on the first and second pairs of blade support members, means pivotally securing said blade holders to the blade carriers, and means for simultaneously reciprocating said pairs of blade support members in opposing short stroke movement to cut a plurality of slabs from the cellular body as the body moves into said blades.

9. The apparatus of claim 8 in which the blades are equally spaced in the path of movement of the cellular body.

10. The apparatus of claim 8 in which shock dampening means are associated with the means pivotally securing the blade holders to the blade carriers.

11. Apparatus for cutting a body of expanded cellular resinous material comprising, in combination, means for advancing the cellular body steadily along a generally fixed path, stationary supporting means in spaced relation to the path of movement of said body, a first pair of blade support members each pivotally mounted along a longitudinal axis on the stationary supporting means at opposing sides of said path of movement, a second pair of blade support members each pivotally mounted along a longitudinal axis on the stationary supporting means at the same opposing sides of the path of movement as said first pair of blade support members and in spaced relation thereto, a blade carrier detachably secured to each member of said pairs of blade support members and having therein a plurality of spaced channels having two opposing parallel planar surfaces transverse with respect to the longitudinal axis of the blade support members, channels in a blade carrier on one blade support member forming corresponding channel pairs with channels in a blade carrier on the other member in each of the pairs of blade support members by reason of alignment along a common plane between the opposing parallel planar channel surfaces, blade holders having two opposing parallel planar outer surfaces slidably fitted between the opposing parallel planar surfaces of the channels, a plurality of thin saw-toothed spaced blades in the path of movement of the cellular body fixedly secured at their ends to the blade holders in the corresponding channel pairs in the blade carriers alternately on the first and second pairs of blade support members, means pivotally securing said blade holders to the blade carriers, and means for simultaneously reciprocating said pairs of blade support members in opposing short stroke movement to cut a plurality of slabs from the cellular body as the body moves into said blades.

12. Apparatus for cutting a body of expanded cellular resinous material comprising, in combination, means for advancing the cellular body steadily along a generally fixed path, stationary supporting means in spaced relation to the path of movement of said body, a first pair of blade support members each pivotally mounted along a longitudinal axis on the stationary supporting means at opposing sides of said path of movement, a second pair of blade support members each pivotally mounted along a longitudinal axis on the stationary supporting means at the same opposing sides of the path of movement as said first pair of blade support members and in spaced relation thereto, a blade carrier detachably secured to each member of said pairs of blade support members and having therein a plurality of spaced channels having two opposing parallel planar surfaces transverse with respect to the longitudinal axis of the blade support members, channels in a blade carrier on one blade support member forming corresponding channel pairs with channels in a blade carrier on the other member in each of the pairs of blade support members by reason of alignment along a common plane between the opposing parallel planar channel surfaces, blade holders having two opposing parallel planar outer surfaces slidably fitted between the opposing parallel planar surfaces of the channels, a plurality of thin saw-toothed spaced blades in the path of movement of the cellular body fixedly secured at their ends to the blade holders in the corresponding channel pairs in the blade carriers alternately on the first and second pairs of blade support members, means pivotally securing said blade holders to the blade carriers, shock dampening means associated with said last-named means, and means for simultaneously reciprocating said pairs of blade support members in opposing short stroke movement to cut a plurality of slabs from the cellular body as the body moves into said blades.

13. The apparatus of claim 12 in which the distance between the opposing parallel surfaces of each channel is the same, the corresponding channel pairs being aligned along the central plane between said surfaces, and the blades equally spaced in the path of movement of the cellular body.

14. The apparatus of claim 12 in which the saw-toothed blades have 15 to 40 teeth per inch with each of the cutting edges set above a longitudinal line at the base of the teeth by an angle between about 40° to 85°.

15. The apparatus of claim 12 in which the shock dampening means is a washer of resilient relatively hard natural rubber, the means pivotally securing the blade holders in the blade carrier channels include an elongated blade tensioning member secured at one end to the blade holder, and said rubber shock dampening washer is on said blade tensioning member.

16. The apparatus of claim 12 in which the blade carriers have opposing shallow recesses in the surface of the carriers adjacent the end of the channels therein farthest removed from the path of movement of the cellular body, the means pivotally securing the blade holders in said blade carrier channels include an elongated blade tensioning member secured at one end to the blade holder, and a pivot washer on said blade tensioning member is secured in the opposing shallow recesses in bridging relation to said end of the channels.

17. A readily detachable and pivotally mountable blade assembly for a multiple blade cutting machine including means for advancing a large cellular resinous body steadily along a fixed path and at least two pairs of blade support members pivotally mounted on a stationary frame on opposing sides of said path for reciprocating spaced blades in the path in opposing short stroke movement; said blade assembly comprising a thin saw-toothed blade, and at each end thereof a blade holder having opposing parallel planar surfaces and at one end a pair of prongs integral therewith compressibly and fixedly securing the blade end, an elogated blade tensioning member at the end of the blade holder opposite the prongs, a pivot washer on said tensioning member having its pivot acting portion adjacent the blade holder and spaceable therefrom, shock dampening means on the tensioning member adjacent the pivot washer, and a bearing member on said tensioning member adjacent said shock dampening means.

18. The blade assembly of claim 17 in which the shock dampening means is a washer of resilient relatively hard natural rubber.

19. The blade assembly of claim 17 in which the pivot washer is V-shaped.

20. The blade assembly of claim 17 in which the blade holder has shallow recesses in each of the opposing machined surfaces and a small opening through said blade holder communicating with the recesses on each surface to permit lubricating liquid applied to one such surface to flow through the blade holder to the opposite surface.

21. A blade carrier for a multiple blade cutting machine including means for advancing a large cellular resinous body steadily along a fixed path and at least two pairs of blade support members pivotally mounted on a stationary frame on opposing sides of said path for reciprocating spaced blades in the path in opposing short stroke movement; said blade carrier comprising a rigid body, a series of spaced parallel channels therethrough each having two opposing parallel machined planar side surfaces adapted to slidably fit a blade holder placed in said channels, opposing shallow recesses immediately adjacent the channel in the surfaces at which the side surfaces of said channel terminate to form one end of the channel, and means permitting said blade carrier to be rigidly and detachably secured to a blade carrier support member pivotally mounted along its longitudinal axis with the centerlines of said parallel blade carrier channels spaced transversely from said longitudinal axis.

22. A blade carrier for a multiple blade cutting machine including means for advancing a large cellular resinous body steadily along a fixed path and at least two pairs of blade support members pivotally mounted on a stationary frame on opposing sides of said path for reciprocating spaced blades in the path in opposing short stroke movement; said blade carrier comprising a rigid elongated L-shaped body, a series of spaced parallel channels extending through one leg of the body and terminating at opposing surfaces, said channels having opposing parallel machined planar side surfaces adapted to slidably fit a blade holder placed in said channels, opposing shallow recesses in one of the surfaces at which the channel terminates and immediately adjacent the channel, said opposing recesses located generally transverse and centrally with respect to the opposing planar side surfaces of said channel, and means associated with the other leg of the L-shaped body permitting said blade carrier to be rigidly and detachably secured to a blade carrier support member pivotally mounted along its longitudinal axis with the centerlines of said parallel blade carrier channels spaced transversely from said longitudinal axis.

23. The blade carrier of claim 22 in which the shallow recesses are V-shaped channels.

24. The blade carrier of claim 22 in which the channels are equally spaced and there is included a second series of channels equally spaced from and alternating with said first series of channels and of sufficient width and depth to permit the free movement of a blade therein.

25. A blade holder for a multiple blade cutting machine including means for advancing a large cellular resinous body steadily along a fixed path and at least two pairs of blade support members pivotally mounted on a stationary frame on opposing sides of said path for reciprocating spaced blades in the path in opposing short stroke movement; said blade holder comprising a heat conductable metal body having opposing parallel planar machined surfaces terminating at opposing sides which are relatively thin compared to the dimensions of said surfaces, a narrow relatively deep channel extending inwardly into said body from one of said sides to form a pair of compressible prongs integral with the body, means for compressing said prongs to fixedly secure a blade end in the channel and means associated with the side opposite said channeled side for attachment of said blade holder to blade tensioning means, said blade holder having shallow recesses in each of the opposing machined surfaces and a small opening through said blade holder communicating with the recesses on each surface to permit lubricating liquid applied to one such surface to flow through the blade holder to the opposite surface.

References Cited by the Examiner
UNITED STATES PATENTS 2,822,004  2/58  Rudolph _____ 83—247 X

FOREIGN PATENTS 617,120  8/35  Germany.
910,956  12/54  Germany.
805,836  12/58  Great Britain.

ANDREW R. JUHASZ, *Primary Examiner.*

WILLIAM S. LAWSON, *Examiner.*